June 29, 1965  C. H. ADAMS  3,191,890
ARRESTING SYSTEMS
Filed April 12, 1962  2 Sheets-Sheet 2
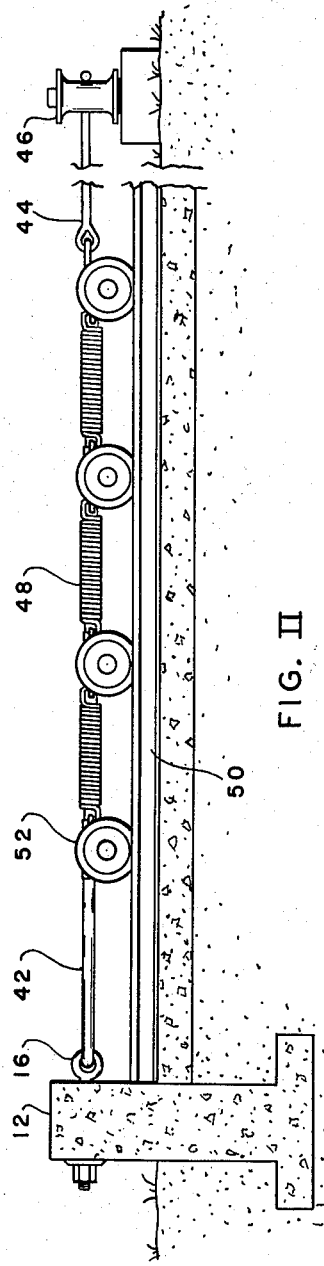
FIG. II
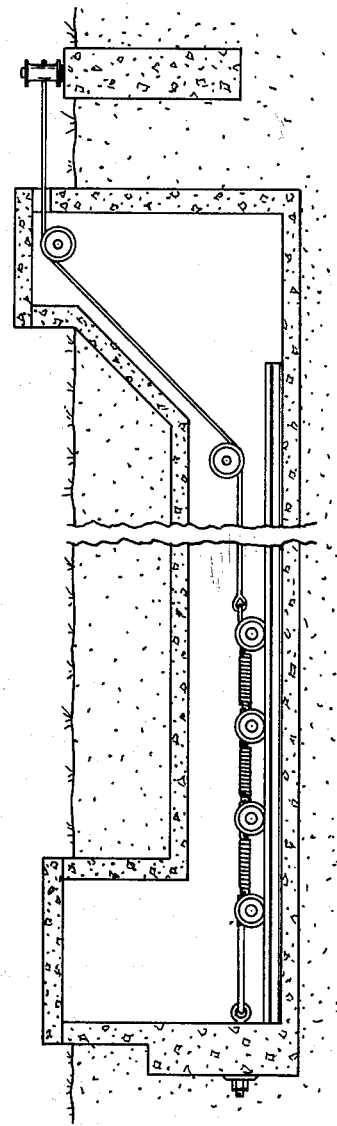
FIG. III
C. HOWARD ADAMS INVENTOR.
BY *Arthur E. Hoffman*
AGENT.

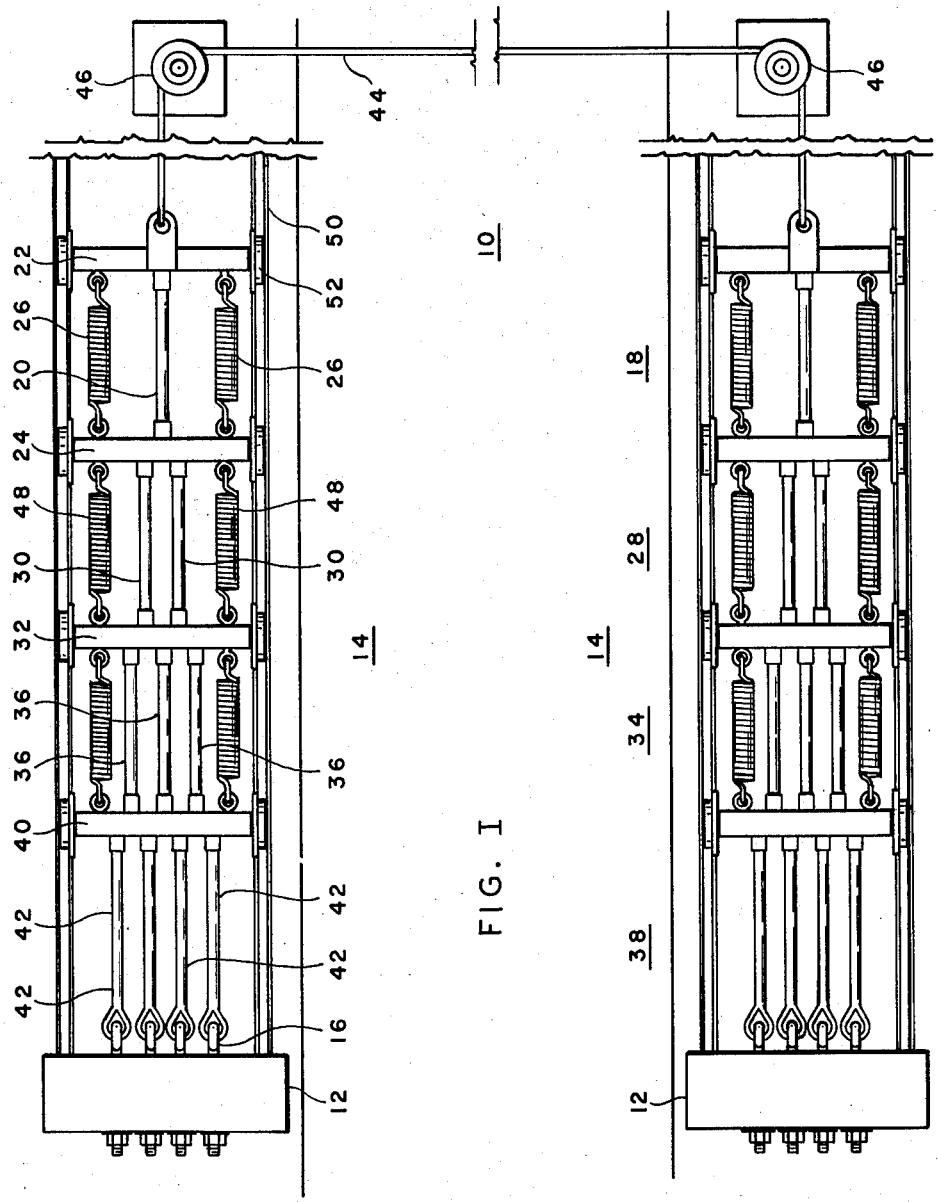

United States Patent Office 3,191,890
Patented June 29, 1965

3,191,890
ARRESTING SYSTEMS
Charles Howard Adams, Longmeadow, Mass., assignor to Monsanto Company, a corporation of Delaware
Filed Apr. 12, 1962, Ser. No. 186,910
4 Claims. (Cl. 244—110)

The present invention relates to aircraft arresting systems. More particularly, the invention relates to apparatus designed to rapidly reduce and arrest the speed of aircraft traveling along airfield runways.

Over the years, air transportation and travel have developed at a faster rate than the airport facilities required for handling the same. A major limitation has been the length of runways, particularly with regard to the newer and larger jet aircraft. Under the existing systems it has become apparent that the braking systems employed are rapidly becoming obsolete and extremely dangerous both in regard to landing and takeoff.

Accordingly, it is an object of this invention to provide improved and safer methods of landing and taking off.

Another object of this invention is to provide means whereby the ground velocity of an aircraft can be rapidly and safely reduced to zero.

A further object of this invention is to provide means whereby aircraft at takeoff or landing speeds can be rapidly halted in the event of emergencies.

These and other objects are attained by direct contact between an appurtenance of an aircraft, which aircraft is traveling at normal speeds along a landing field runway, and a pendant line suspended transversely across said runway and being attached at both ends to energy-absorption means, said energy-absorption means being comprised of an arrangement of viscoelastic polymeric materials whereby a series of load-bearing ranges may be attained.

The following drawings are provided for the purpose of illustrating various embodiments of the present invention.

FIG. I is a top view, showing the preferred pendant and energy-absorption means attached at both ends of said pendant.

FIG. II is a side view of the same embodiment shown in FIG. I.

FIG. III is a side view illustrating an underground embodiment of the energy-absorption means used in the present invention.

Referring in detail to the figures of the drawings, and more particularly FIGS. I and II, there is schematically shown an aircraft arresting system, arranged about an aircraft runway 10, comprising a pair of vertically-oriented stanchions, sometimes called dead men, 12—12, adjacent opposite sides of an aircraft runway, and a pair of energy-absorption means 14, each connected to one of the stanchions 12 by any suitable means such as a plurality of eye bolts 16. The energy-absorption means 14 comprises a series of stages and each stage consists of a substantially parallel arrangement of viscoelastic damping cords specially designed for bearing instantaneously exerted loads within designated poundal ranges. FIG. I illustrates a 4-stage energy-absorption means 14, consisting of a primary stage 18 provided with a single viscoelastic cord 20 connected at each of its ends to energy-transfer connectors 22 and 24, respectively, and a pair of heavy duty springs 26—26, also connected at each of their respective ends to the energy-transfer connectors 22 and 24. The energy-transfer connector 24, in turn, connects the primary stage 18 to a secondary stage 28, which secondary stage is similar to the primary stage except that two viscoelastic cords 30—30 are connected between energy-transfer connector 24 and a third energy-transfer connector 32. A third stage 34 is also illustrated in FIG. I, differing from the secondary stage 28, by an additional viscoelastic cord which constitutes a total of three substantially parallel cords 36—36—36. Stage 34 is, in turn, connected to a base stage 38 through energy-transfer connector 40. The base stage is provided with four substantially parallel viscoelastic cords 42—42—42—42, each of which is connected directly to one of the upright stanchions 12 by one of the plurality of eye bolts 16. The base stage may or may not be provided with a pair of connecting springs.

As previously mentioned, stanchions 12—12 are located on opposite sides of an aircraft runway and serve to anchor the two energy-absorption means 14—14, each of which is connected at their opposite ends or primary energy connectors 22—22 to a pendant line or wire 44. The pendant line is shown supported by a pulley means 46—46 and suspended transversely over the aircraft runway 10, approximately 4 to 8 inches above ground level.

Each stage of the respective energy-absorption means is designed to rapidly dampen designated levels of kinetic energy caused by the impact of an aircraft appurtenance against the pendant line 44. In other words, a force exerted on pendant wire 44 will pull the wire in the direction of the applied force and cause the energy-transfer connectors 22—22 to move towards their respective pulley means 46—46, thereby elongating viscoelastic cord 20 of primary stage 18 which, in turn, serves to dampen the kinetic energy caused by the initial force of impact. As the force against the pendant line 44 increases, causing cord 20 to further elongate, a counterbalancing or resisting force is brought into play by the increased tension on spring pairs 26—26. The spring pairs 26—26 serve to limit the extent of primary stage elongation thereby causing any further elongation to take place within the secondary stage 28 along viscoelastic cords 30—30. In like manner, the increasing tension placed upon springs 48—48 will limit the extent of secondary stage 28 elongation thereby causing any further elongation to take place within the third stage 34.

Consequently, an aircraft can be halted while in motion along a runway by a hook or other appurtenance of said aircraft, striking or engaging the transverse pendant line 44 with a minimum peak force or shock as a result of the rapid dissipation of energy along the various stages of the energy-absorption means.

Depending on the size or diameter of the individual viscoelastic cords, the impact force of a light airplane traveling at a low speed may possibly be dissipated through the primay stage alone. On the other hand, higher impact forces associated with higher speeds and/or weights of moving aircraft would require additional energy-absorption stages to fully dissipate the resulting shock.

A special feature of this invention is the counterbalancing effect of the springs associated with each of the energy-absorption stages. If the limit of elongation of the viscoelastic cords were not controlled, cord rupture would result or, at the very least, the entire force of impact would have to be absorbed by the primary stage pairs. The springs thereby prevent over-elongation of the viscoelastic cords of each stage, with the result that the higher levels of kinetic energy are transferred to succeeding stages for dissipation.

The energy-transfer connectors connect the various stages to each other. To maintain the alignment of these various stages within the energy-absorption means, it is preferable to mount the conectors on a rail 50 through wheels or other slideable means 52 to permit longitudinal motion of the connectors.

The pendant line 44 is generally suspended about 4 to 6 inches above ground level and should be designed to withstand instantaneously exerted loads up to 300,000 lbs. Although many types of metal alloys may be used, the pendant line is generally constructed of steel. In any event, it is important that the wire be sufficiently flexible for engagement with the pulley means situated on the opposite sides of the runway. If desired, the whole or any part of the pendant line may be composed of viscoelastic materials such as is used for the cords of the energy-absorption units.

The viscoelastic cords of this invention may be fabricated from known viscoelastic damping materials. One such material is plasticized polyvinyl butyral that is commonly used as an interlayer in safety glass windshields and which possesses excellent force damping characteristics.

The basic stage shown in FIG. I is not provided with springs since the residual shock waves reaching the base stage are generally low. However, if desired, tensile springs may be utilized if it is felt larger forces may be encountered. The energy-absorption means shown in FIG. I consists of four stages, but it is obvious that more or less than four stages may be utilized, depending on the range of forces expected to be encountered (i.e., sizes and velocity of aircraft).

In FIG. III is illustrated an alternate method of installation for the energy-absorption means. More specifically, the energy-absorption means is situated beneath the level of the ground surface in parallel with ecah other on opposite sides of the runway. A particular advantage is gained if the absorption means are located below the frost depth line in that the energy-absorbing properties of the viscoelastic material of the cords will be less affected by the temperature variations of extreme climatic conditions. Furthermore, with respect to both methods of installation, the number of cords between the various energy-transfer connectors may be varied depending on the seasons of the year.

The energy-absorption equipment may be positioned on runways to either halt the motion of incoming aircraft or the motion of departing aircraft in emergency situations. Emergency situations might include a failure to gain sufficient lift velocity with relation to the length and terminus of the runway or failure of braking means for either incoming or departing aircraft. The use of these systems for standard use or in the event of emergencies could be optional and, if desired, the pendant line could be disconnected when the system is not being used.

The energy-absorption means are shown in the drawing parallel to each other on opposite sides of the runway. However, it is possible to situate the energy-absorption means at any convenient angle as long as the pendant line is maintained substantially transverse to the runway strip.

The sponsored apparatus contributes high efficiency for dissipation of shock waves and yet is simple in operation and serves to minimize the hazards of air travel. Additionally, the sponsored apparatus serves to maximize the use of shorter runways which are otherwise advancing towards obsoletion.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description shall be interpreted as illustrative and not in a limiting sense.

What is claimed is:

1. An apparatus for arresting the motion of an aircraft travelling along runways comprising, in combination, a pendant line, designed to engage an appurtenance on said aircraft, suspended across an aircraft runway and a pair of energy-absorption means positioned on opposite sides of said aircraft runway, each of said energy-absorption means being attached at one end to said pendant line and at the other end to fixed stanchion means; each of said energy-absorption means comprising a plurality of stages connected in series such that the initial stage connecting said pendant line is provided with at least one cord composed of viscoelastic polymeric material and at least one spring to limit the elongation of said cord and the succeeding stages are provided with an increased number of cords composed of viscoelastic polymeric material arranged in parallel to provide a series of increasing load-bearing ranges.

2. The apparatus according to claim 1 wherein each stage includes an energy-transfer connector provided with sliding means adapted for sliding engagement with a stationary guide rail.

3. The apparatus according to claim 1 wherein the energy-absorption means are situated below ground level.

4. An apparatus for arresting the motion of an aircraft travelling along runways comprising, in combination, a pendant line, designed to engage an appurtenance on said aircraft, suspended across an aircraft runway and a pair of energy-absorption means positioned on opposite sides of said aircraft runway; each of said energy-absorption means being attached at one end to said pendant line and at the other end to fixed stanchion means and comprising a plurality of stages connected in a series, each stage including at least one cord composed of viscoelastic polymeric material adapted to absorb energy within a predetermined poundal range and wherein at least one of the stages comprises, in combination, an energy transfer connector, at least one cord composed of viscoelastic polymeric material and at least one spring to limit the elongation of said cord, said cord and said spring being arranged in parallel and attached at one of their respective ends to said connector.

References Cited by the Examiner

UNITED STATES PATENTS

| 2,151,704 | 3/39 | King | 244—110 |
| 2,465,936 | 3/49 | Schultz | 244—110 |
| 2,692,741 | 10/54 | Glass | 244—110 |
| 3,033,498 | 5/62 | Baas | 244—110 |
| 3,079,110 | 2/63 | Maiorca | 244—110 |

FOREIGN PATENTS

| 1,230,584 | 4/60 | France. |

MILTON BUCHLER, *Primary Examiner.*

ANDREW H. FARRELL, *Examiner.*